April 1, 1969     M. F. RUFFLEY, JR     3,436,093
RACK FOR CYLINDRICAL CONTAINERS
Filed May 11, 1967
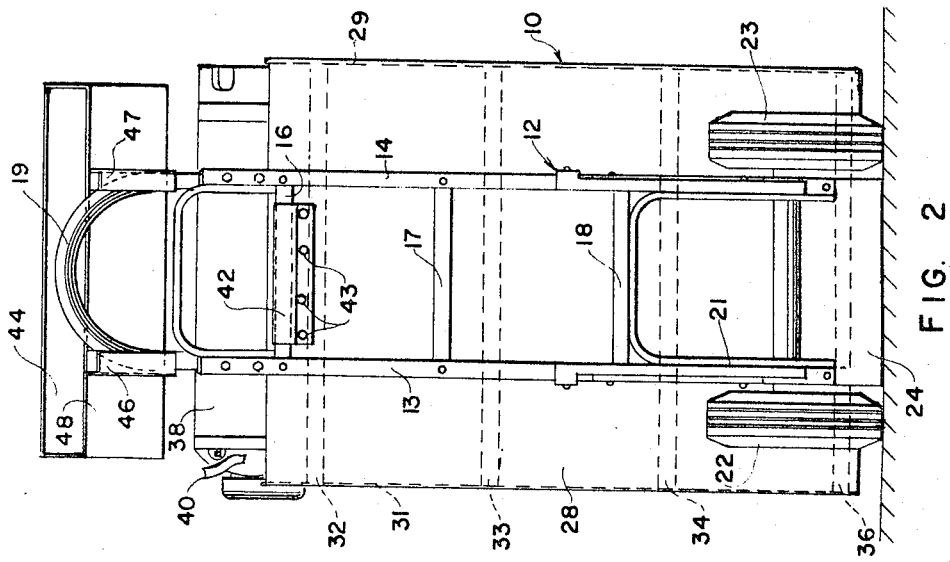
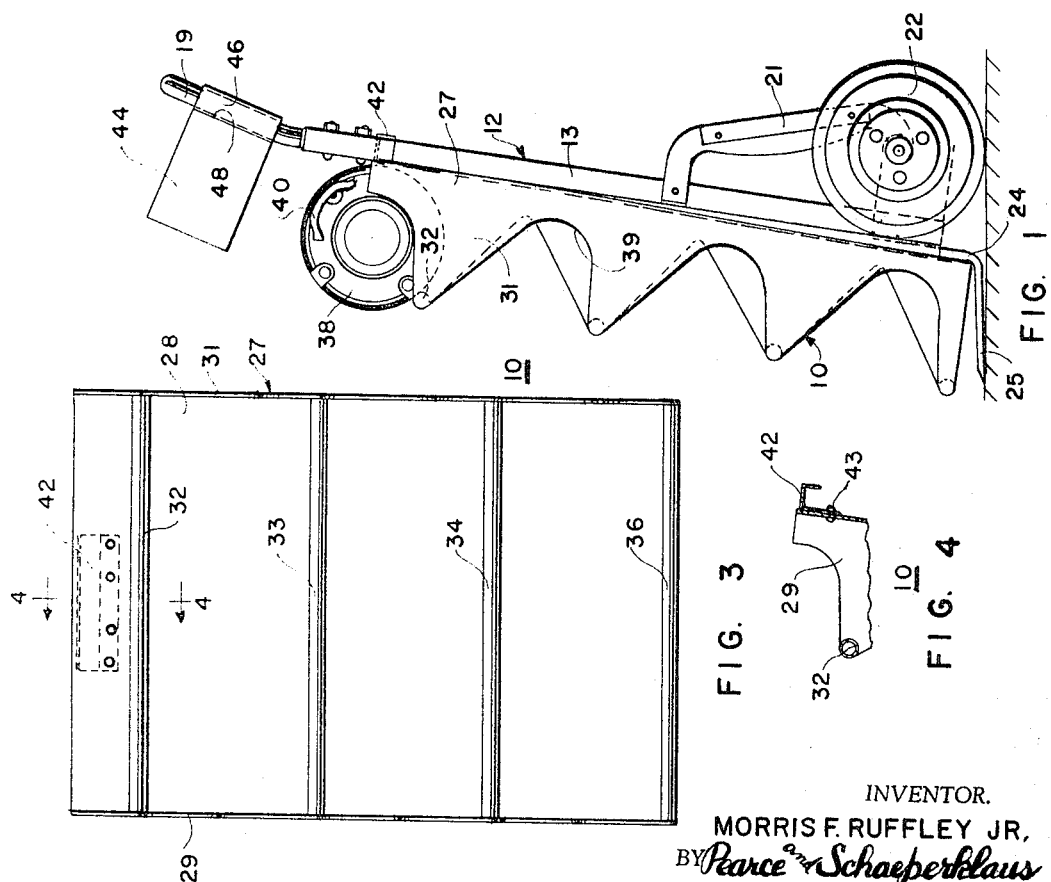
INVENTOR.
MORRIS F. RUFFLEY JR,
BY *Pearce Schaeperklaus*
Attorneys United States Patent Office 3,436,093
Patented Apr. 1, 1969

3,436,093
RACK FOR CYLINDRICAL CONTAINERS
Morris F. Ruffley, Jr., Silverton, Ohio, assignor to The Coca-Cola Bottling Works Company, Cincinnati, Ohio, a corporation of Ohio
Filed May 11, 1967, Ser. No. 637,797
Int. Cl. B62b 1/00, 7/02, 1/06
U.S. Cl. 280—47.27         6 Claims

ABSTRACT OF THE DISCLOSURE

A rack for a hand truck which is arranged to support a plurality of cylindrical containers which includes a channel-shaped body, spaced parallel bars linking the flanges of the body, each container being adapted to rest on one of the bars and against the web of the body, and means for hanging the rack on the hand truck.

This invention relates to a rack for a hand truck for carrying a plurality of cylindrical containers.

Cylindrical containers used in the soft drink industry particularly to hold premixed carbonated beverages for beverage dispensers and for other purposes are heavy and inconvenient to carry by hand. An object of this invention is to provide a wheeled assembly suitable for transportating such containers.

A further object of this invention is to provide a rack for carrying such cylindrical containers which can readily be mounted on a hand truck of the type ordinarily used for transporting bottles of carbonated beverages in case lots to form such an assembly.

Briefly, this invention provides a rack which can be hung on a cross member of a hand truck and includes a generally channel-shaped body provided with a plurality of spaced parallel cross bars spanning the flanges of the body. The cross bars are parallel to the web of the body and spaced therefrom a distance greater than the radius of one of the containers and less than a diameter thereof so that each cross bar can support one of the containers with the container resting against the web of the body. At least one of the flanges can be cut away above each cross bar to permit access to a handle or the like at a head end of each container.

The above and other objects and features of the invention will be apparent to those skilled in the art to which this invention pertains from the following detailed description and the drawing, in which:

FIG. 1 is a view in side elevation of a hand truck equipped with a rack constructed in accordance with an embodiment of this invention, an auxiliary rack being shown in association therewith;

FIG. 2 is a view in rear elevation of the hand truck and racks shown in FIG. 1;

FIG. 3 is a view in front elevation of the rack removed from the hand truck; and FIG. 4 is a fragmentary view in section taken on the line 4—4 in FIG. 3.

In the following detailed description and the drawing, like reference characters indicate like parts.

In FIGS. 1 and 2 is shown a rack 10 constructed in accordance with an embodiment of this invention. The rack is mounted on a hand truck 12 which includes a body formed of side frames 13 and 14 (FIG. 2) spaced by cross frames 16, 17 and 18. A generally inverted U-shaped handle frame 19 spans the upper ends of the side frames 13 and 14. A wheel frame 21 is attached to lower end portions of the side frames 13 and 14. Wheels 22 and 23 are rotatably mounted on the wheel frame 21 in position for supporting the hand truck for rolling movement. An angle-shaped nose piece member 24 is also attached to lower end portions of the side frames 13 and 14, and a forwardly extending flange or nose piece 25 thereof (FIG. 1) can be used to support objects on the hand truck.

The rack 10 includes a body 27 of generally channel shape and including a web 28 (FIG. 3) and flanges 29 and 31. Spaced parallel cross bars 32, 33, 34 and 36 are attached to and span the flanges 29 and 31. As shown in FIG. 4, the cross bars can be tubular in form. The cross bars are rigidly attached to the flanges as by welding. The cross bars are parallel to the web 28 and can be equally spaced therefrom. The rack is arranged to support a plurality of cylindrical containers of the type used to contain premixed carbonated beverages for use in drink dispensing machines, one of which is indicated at 38 in FIGS. 1 and 2. As shown, the spacing between the cross bars and the web of the rack body is greater than the radius of the container 38 but less than the diameter so that the container can rest on one of the cross bars, as the container 38 rests on the cross bar 32 with the wall of the container also resting against the web 28 of the rack body. At least one of the flanges can be cut away above each of the cross bars as indicated at 39 in FIG. 1 to provide a space through which a handle 40 of a container can be reached. A hook-shaped hanger 42 is attached to a rear face of the web 28 by rivets 43 (FIG. 4). As shown in FIGS. 1 and 2, the hanger 42 can fit over the cross frame 16 of the truck to support the rack with the lower edge of the web 28 at or nearly at the nose piece 25 so that the weight of the rack and containers thereon is supported by the cross frame 16 and by the nose piece 25.

An auxiliary rack 44 can be carried by the handle frame 19. The auxiliary hack 44 is of open-topped box shape with inwardly facing channel-shaped support brackets 46 and 47 firmly attached to a rear face 48 thereof. The channel-shaped supports fit over side portions of arms of the handle frame 19 as shown in FIG. 2. The auxiliary rack can be used to carry cups and the like and other small articles (not shown) which can be needed for full servicing of a drink dispensing machine.

The rack construction illustrated in the drawing and described above is subject to structural modification without departing from the spirit and scope of the appended claims.

Having described my invention, what I claim as new and desire to secure by Letters Patent is:

1. A rack for a hand truck for holding cylindrical objects which comprises a body of channel shape having a web and spaced flanges, a plurality of spaced cross bars spanning the flanges, each of the cross bars being adapted to support one of the cylindrical objects with a wall of the object engaging the web, at least one of the flanges being cut away above each cross bar and in alignment with a head end of a container supported thereon to provide access to handle means at said head end, and means for hanging the rack on a frame member of the hand truck.

2. A rack as in claim 1 wherein the cross bars are parallel to the web and to each other.

3. A rack as in claim 2 wherein the cross bars are equally spaced from the web.

4. In combination, a hand truck having a body including a lengthwise frame, a transverse frame member mounted on the lengthwise frame, wheels mounted on a lower portion of the lengthwise frame for supporting the frame for rolling movement, the transverse frame member being spaced above the wheels, and a rack for holding cylindrical objects removably mounted on the hand truck, the rack including a body of channel shape having a web and spaced flanges, a plurality of spaced cross bars spanning the flanges, each of the cross bars being adapted to support one of the cylindrical objects with a wall of the object engaging the web, at least one of the flanges being cut away above each cross bar and in alignment with a head end of a container supported thereon to provide access to handle means at said head end, and means on the web releasably engageable with the transverse frame member for hanging the rack on the hand truck with the cylindrical objects supported thereby.

5. A combination as in claim 4 wherein an inverted U-shaped handle is mounted at the upper end of the lengthwise frame extending upwardly therefrom and an auxiliary rack is mounted on the handle.

6. In combination, a hand truck having a body including a lengthwise frame, a transverse frame member mounted on the lengthwise frame, wheels mounted on a lower portion of the lengthwise frame for supporting the frame for rolling movement, the transverse frame member being spaced above the wheels, and a rack for holding cylindrical objects removably mounted on the hand truck, the rack including a body of channel shape having a web and spaced flanges, a plurality of spaced cross bars spanning the flanges, each of the cross bars being adapted to support one of the cylindrical objects with a wall of the object engaging the web, means on the web releasably engageable with the transverse frame member for hanging the rack on the hand truck with the cylindrical objects supported thereby, an inverted U-shaped handle mounted at the upper end of the lengthwise frame extending upwardly therefrom, and an auxiliary rack mounted on the handle, the auxiliary rack including a body and a pair of inwardly directed spaced channel-shaped support brackets mounted on the body, the support brackets engaging opposite side arms of the handle.

References Cited

UNITED STATES PATENTS 2,719,640    10/1955    Copas et al. _____ 214—372
3,052,484    9/1962    Huffman et al. __ 280—47.19 X

FOREIGN PATENTS

Ad. 18,697    1/1907    Great Britain.

BENJAMIN HERSH, *Primary Examiner.*

JOHN A. PEKAR, *Assistant Examiner.*

U.S. Cl. X.R.

214—372